United States Patent
Penne et al.

(10) Patent No.: US 12,447,864 B2
(45) Date of Patent: Oct. 21, 2025

(54) ELECTRIFIED VEHICLE WITH WOUND ROTOR SYNCHRONOUS ELECTRIC MACHINE CONTROLLED TO HEAT BATTERY

(71) Applicant: Ford Global Technologies, LLC, Dearborn, MI (US)

(72) Inventors: Matthew Penne, Hadar, NE (US); Jonathan Hair, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 300 days.

(21) Appl. No.: 18/105,067

(22) Filed: Feb. 2, 2023

(65) Prior Publication Data
US 2024/0262251 A1    Aug. 8, 2024

(51) Int. Cl.
*B60L 58/26*     (2019.01)
*B60L 50/51*     (2019.01)
(Continued)

(52) U.S. Cl.
CPC .............. *B60L 58/26* (2019.02); *B60L 50/51* (2019.02); *B60L 50/60* (2019.02); *H02P 23/00* (2013.01);
(Continued)

(58) Field of Classification Search
CPC .......... B60L 58/26; B60L 50/51; B60L 50/60; B60L 2210/42; B60L 15/20; B60L 58/27;
(Continued)

(56) References Cited

U.S. PATENT DOCUMENTS

| | | |
|---|---|---|
| 11,059,351 B2 | 7/2021 | Zenner et al. |
| 11,218,045 B2 | 1/2022 | Yang et al. |
| (Continued) | | |

FOREIGN PATENT DOCUMENTS

CN     113472170 A     10/2021

OTHER PUBLICATIONS

M. Bash et al.—A Comparison of Permanent Magnet and Wound Rotor Synchronous Machines for Portable Power Generation, Department of Electrical and Computer Engineering Faculty Publications; Purdue University—Purdue e-Pubs; 2010; 7 Pages.

*Primary Examiner* — Bickey Dhakal
(74) *Attorney, Agent, or Firm* — Brooks Kushman PC; David B. Kelley

(57) ABSTRACT

An electrified vehicle includes a wound rotor synchronous electric machine configured to provide propulsive torque to wheels of the electrified vehicle and having a rotor with rotor windings and a stator with stator windings, a battery electrically coupled to the electric machine, a cooling system arranged to circulate a cooling fluid that transfers heat from the electric machine to the battery, and a controller programmed to, for a specified electric machine torque, control rotor current to the rotor windings and control stator current to the stator windings to operate the machine at an inefficient operating point that increases stator power losses to generate heat transferred to the cooling fluid to heat the battery, cabin, and/or other components. The controller performs closed-loop feedback control of stator winding current and rotor winding current based on a target machine output torque and target stator power loss to control the amount of heat generated.

17 Claims, 8 Drawing Sheets

(51) Int. Cl.
  *B60L 50/60* (2019.01)
  *H02P 23/00* (2016.01)
  *H02P 25/022* (2016.01)
  *H02P 27/06* (2006.01)

(52) U.S. Cl.
  CPC ............ *H02P 25/022* (2013.01); *H02P 27/06* (2013.01); *B60L 2210/42* (2013.01)

(58) Field of Classification Search
  CPC ......... B60L 2240/423; B60L 2240/429; H02P 23/00; H02P 25/022; H02P 27/06; B60H 1/04; B60K 1/00; B60K 11/02; B60K 11/04; B60K 2001/006; B60K 2001/008
  See application file for complete search history.

(56) References Cited

U.S. PATENT DOCUMENTS

| | | | |
|---|---|---|---|
| 2018/0162369 A1* | 6/2018 | Colavincenzo | B60L 15/2054 |
| 2019/0070924 A1 | 3/2019 | Mancini et al. | |
| 2022/0077518 A1* | 3/2022 | Ling | H01M 10/48 |
| 2022/0329184 A1* | 10/2022 | Lian | B60L 58/10 |
| 2024/0001777 A1* | 1/2024 | Li | B60L 58/25 |
| 2024/0056013 A1* | 2/2024 | Lin | B60L 58/27 |
| 2024/0326654 A1* | 10/2024 | Okada | B60L 3/00 |

\* cited by examiner

ELECTRIFIED VEHICLE WITH WOUND ROTOR SYNCHRONOUS ELECTRIC MACHINE CONTROLLED TO HEAT BATTERY

TECHNICAL FIELD

This application is related to control of a wound rotor synchronous electric machine to generate heat for heating other components of an electrified vehicle.

BACKGROUND

Electrified vehicles, including electric vehicles and hybrid electric vehicles, use a battery to power one or more electric machines that provide propulsive torque to vehicle wheels. Cold temperatures may decrease battery performance during both charging and discharging operation, particularly for lithium iron phosphate (LiFePO$_4$, Lithium Ferro Phosphate, or LFP) batteries. Electrified vehicles may generate insufficient waste heat under these operating conditions to provide desired heating of the passenger cabin or various vehicle components, such as the battery. As such, one or more electric heaters may be provided, but increase part count and system complexity and may further reduce overall efficiency and vehicle electric range.

SUMMARY

In various embodiments, an electrified vehicle includes a wound rotor synchronous electric machine configured to provide propulsive torque to wheels of the electrified vehicle, the electric machine having a rotor with rotor windings and a stator with stator windings, a battery electrically coupled to the electric machine, a cooling system arranged to circulate a cooling fluid that transfers heat from the electric machine to the battery, and a controller programmed to, for a specified electric machine torque, control rotor current to the rotor windings and control stator current to the stator windings in response to temperature of the cooling fluid. The controller may be further programmed to, for the specified electric machine torque, reduce the rotor current and increase the stator current when the temperature of the cooling fluid is below an associated threshold relative to the rotor current and stator current when the temperature of the cooling fluid is not below the associated threshold. The controller may be further programmed to control the rotor current and the stator current responsive to a target power loss for the stator windings. The controller may be further programmed to control the rotor current and the stator current in response to a difference between the temperature of the cooling fluid and a desired temperature of the cooling fluid. The controller may be further programmed to reduce the rotor current to a predetermined rotor current that is independent of the specified electric machine torque, and to increase the stator current to deliver the specified electric machine torque. The electric machine may be a three-phase electric machine with the electrified vehicle further including a first inverter in communication with the controller and configured to convert DC power from the battery to AC power supplied to the stator windings, wherein the cooling system is further arranged to transfer heat from the inverter to the battery. A second inverter in communication with the controller may be configured to convert a pulse width modulated signal to a DC current supplied to the rotor windings.

In one or more embodiments, the electrified vehicle may further include a transmission configured to transmit torque from the electric machine to the wheels, wherein the cooling system comprises an oil cooling loop including an oil-to-coolant heat exchanger and arranged to circulate the cooling fluid through the electric machine, the transmission, and the oil-to-coolant heat exchanger, and a coolant loop including a radiator, and a heater core configured to heat a passenger cabin, the coolant loop arranged to selectively circulate coolant through the heater core, and to circulate coolant through the radiator, the inverter, and the heat exchanger. The electrified vehicle may also include an internal combustion engine configured to operate at least one electric machine as a generator to charge the battery and/or to provide propulsive torque to vehicle wheels.

Embodiments may also include a method for controlling an electrified vehicle having a battery powering a wound rotor synchronous machine (WRSM) configured to provide propulsive torque to vehicle wheels. The method may include, by a controller, for a specified output torque of the WRSM, controlling DC current of rotor windings to a first rotor current value and AC current of stator windings to a first stator current value to generate the specified output torque when temperature of the battery is above an associated threshold, and controlling the DC current of the rotor windings to a second rotor current value less than the first rotor current value and the AC current of the stator windings to a second stator current value greater than the first stator current value to generate the specified output torque otherwise. The method may further include controlling a cooling system of the electrified vehicle to transfer heat from the WRSM to the battery when the temperature of the battery is below the associated threshold. The second rotor current value and the second stator current value may be based on a target power loss of the stator windings. The method may also include retrieving the second rotor current value and the second stator current value from a lookup table stored in a non-transitory computer readable storage medium. The second rotor current value may be a predetermined constant value that is independent of the specified output torque of the WRSM. The method may also include controlling a cooling system of the electrified vehicle to transfer heat from the WRSM to a passenger cabin of the electrified vehicle.

In one or more embodiments a system includes a wound rotor synchronous machine (WRSM) having a rotor winding and a stator winding, a cooling system configured to circulate a fluid that transfers heat from the WRSM to at least one other component of the system, and a controller programmed to perform closed-loop control of DC current to the rotor winding and AC current to the stator winding responsive to a target output torque and stator power loss of the WRSM. The target stator power loss may be based on temperature of the at least one other component, which may include the temperature of the at least one other component being below a corresponding temperature threshold, or a difference between a current temperature of the at least one other component and a desired or target temperature of the at least one other component. The controller may retrieve a target DC current and a target AC current from a lookup table indexed by the target torque and stator power loss. The WRSM may be a three-phase electric machine. The at least one other component may include a battery electrically connected to the WRSM and/or a heater core configured to provide heat to a vehicle cabin.

Control of a WRSM and associated cooling system to provide heating of one or more vehicle components according to the present disclosure may have one or more advantages. For example, WRSMs have comparable power density to permanent magnet motors and are comparable to less expensive induction motors. WRSMs may be controlled to provide higher power loss and associated faster heating compared to permanent magnet machines because WRSMs do not use permanent magnets that may demagnetize under such high current, high heat operating conditions. Similarly, WRSMs do not require rare earth magnets whose price and availability are subject to market volatility. Faster heating using WRSMs may allow elimination of one or more auxiliary heaters and may facility use of battery chemistries, such as LFP, that have many desired charging and discharging characteristics but that do not perform well in cold temperatures and may require significant heating. Closed loop control of rotor and stator currents may provide more accurate control of power losses for heating as compared to passive waste heat strategies, and may be used to generate heat while also provide propulsive torque.

DETAILED DESCRIPTION

As required, detailed representative examples of the claimed subject matter are disclosed herein; however, it is to be understood that the disclosed examples are merely representative and may be implemented in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
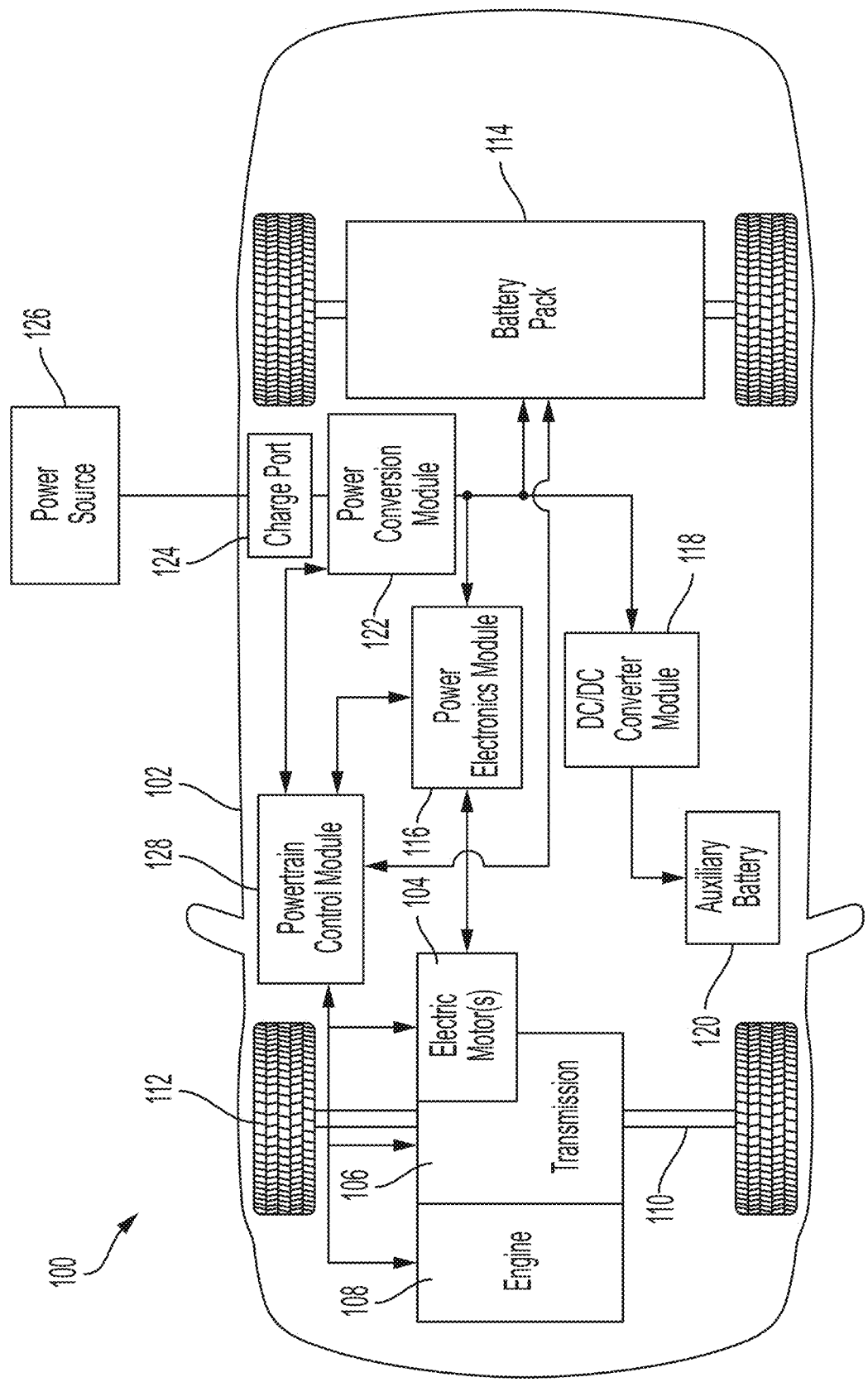
FIG. 1 is a block diagram illustrating a representative electrified vehicle having a WRSM controlled to provide component heating.

FIG. 1 depicts an example of a wound rotor synchronous machine (WRSM) in an electrified vehicle 100, which is implemented as a plug-in hybrid-electric vehicle. The electrified vehicle 100 may comprise one or more three-phase electric machines 104, at least one of which is a WRSM, mechanically connected to a transmission 106. The WRSM (s) 104 may be controlled to provide heating of one or more other vehicle components as described in greater detail herein.

Transmission 106 is mechanically connected to an internal combustion engine 108 for hybrid implementations. Engine 108 may be configured to provide propulsive torque to vehicle wheels 112, or alternatively configured to operate one or more generators that deliver electric power to electric machines 104. The transmission 106 may also be mechanically connected to a drive shaft 110 that is mechanically connected to the wheels 112. The electric machines or motor/generators 104 can provide propulsion whether the engine 108 is turned on or off. The electric machines 104 may operate as motors, generators, or both and can extend the range of the vehicle by recovering energy during regenerative braking. Electrified vehicle 100 may also be implemented as a battery electric vehicle without an engine 108 and powered solely by traction battery 114.

Traction battery or battery pack 114 stores energy that can be used by the electric machines 104. A vehicle battery pack 114 typically provides a high voltage (HV) DC output provided by connecting hundreds of low voltage cells together. The battery pack 114 is electrically connected to a power electronics module 116. The power electronics module 116 is also electrically connected to the electric machines 104 and provides the ability to bi-directionally transfer energy between the battery pack 114 and the electric machines 104. For example, a typical battery pack 114 may provide a DC voltage/current while the electric machines 104 may require a three-phase AC voltage/current. The power electronics module 116 converts the DC voltage to a three-phase AC current as required for the stator windings of WRSM(s) 104 and may also be referred to as an inverter in various applications. Power electronics module 116 may also include a voltage converter that increases the DC voltage from the battery pack 114 supplied to the HV DC bus that powers the inverter. In a regenerative mode, the power electronics module 116 will convert the three-phase AC current from the electric machines 104 acting as generators to the DC voltage required to recapture energy in the battery pack 114. Power electronics module 116 may also include an H-bridge inverter that converts a pulse width modulated (PWM) control signal to a DC current provided to the rotor windings of WRSM(s) 104.

In addition to providing energy for propulsion, the battery pack 114 may provide energy for other vehicle electrical systems. A typical system may include a DC/DC converter module 118 that converts the high voltage DC output of the battery pack 114 to a low voltage DC supply that is compatible with other vehicle loads. Other high voltage loads, such as compressors and electric heaters, may be connected directly to the high-voltage bus from the battery pack 114. In a typical vehicle, the low voltage systems are electrically connected to a 12V, 24V, or 48V battery 120.

The battery pack 114 may be recharged by an external power source 126. The external power source 126 may provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122, sometimes referred to as a charger or charging module. The power conversion module may condition the power from the external power source 126 to provide the proper voltage and current levels to the battery pack 114. In some applications, the external power source 126 may be configured to provide the proper voltage and current levels to the battery pack 114 and the power conversion module 122 may not be necessary. The functions of the power conversion module 122 may reside in the external power source 126 in some applications. The vehicle engine, transmission, electric machines, battery, power conversion, power electronics, and various other control modules, components, or systems may be controlled by a powertrain control module (PCM) 128. Alternatively, or in combination, various systems or subsystems may include associated control modules or controllers in communication with PCM 128 over a vehicle wired or wireless network to provide coordinated control of the vehicle. As used in this disclosure, a controller generally refers to one or more control modules or controllers that may cooperate to perform a particular task or function and is not limited to a single controller or any particular dedicated controller or control module.

Figure 2:
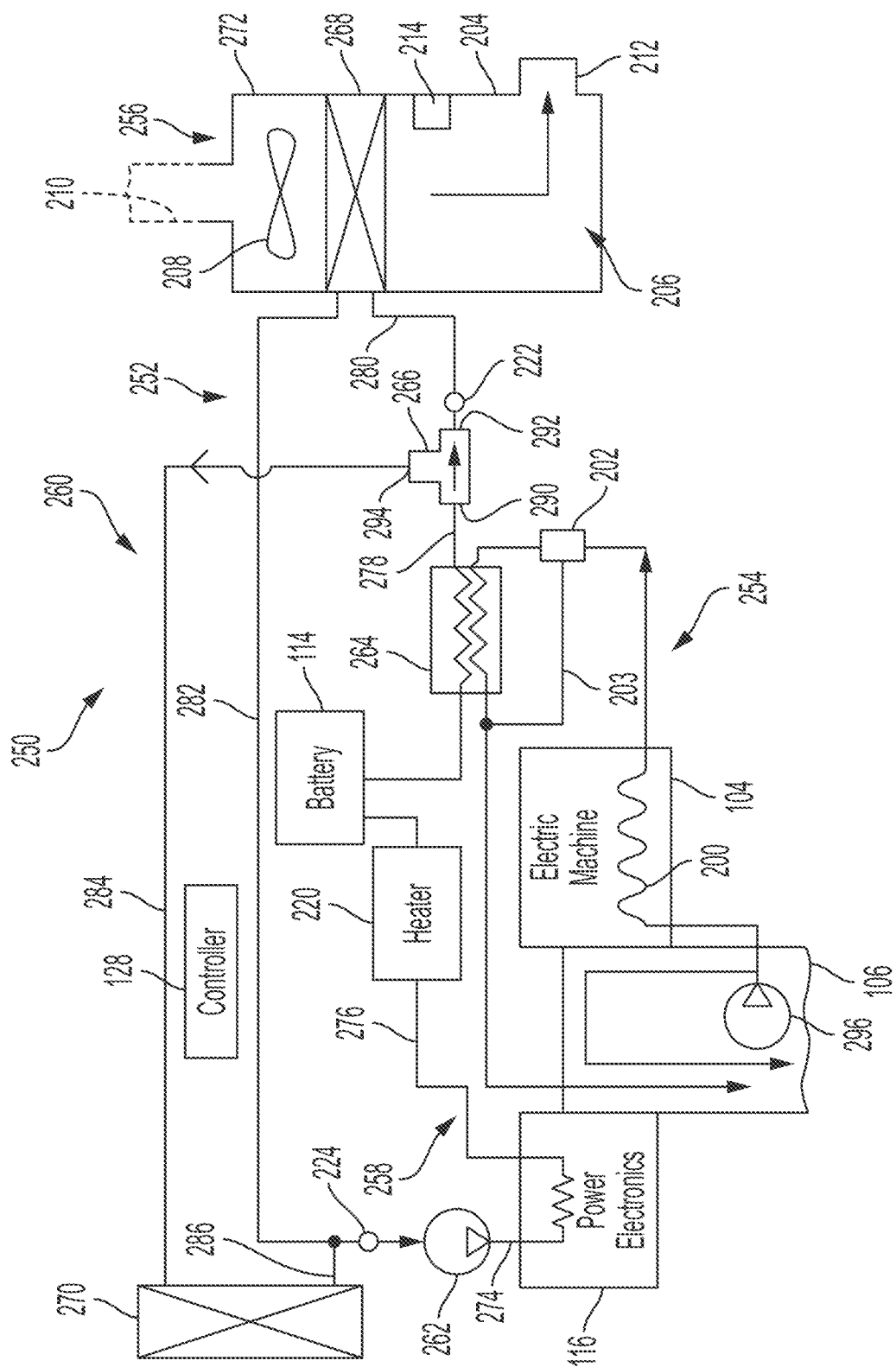
FIG. 2 is a block diagram illustrating a representative system including a WRSM and associated cooling system to transfer heat from a WRSM to various components.

Referring to FIG. 2, a representative thermal management or cooling system 250 includes a first cooling loop 252 using a first cooling fluid, a second cooling loop 254 using a second cooling fluid, and a cabin climate control loop 256. The first cooling loop 252 and the second cooling loop 254 are in thermal communication via a heat exchanger 264. In one embodiment, the first cooling fluid is a water-based coolant and may include ethylene glycol or similar additives, the second cooling fluid is an oil-based fluid, and the heat exchanger is an oil-to-coolant heat exchanger. The first cooling loop 252 is configured to thermally manage the power electronics 251 including the inverter 226 and/or the DC/DC converter 228 and to provide heat to the cabin climate control loop 256 by circulating coolant to an HVAC unit 272.

The first cooling loop 252 includes a main loop 258, a radiator loop 260, and a valve 266 for controlling fluid flow between the loops 258, 260. The first cooling loop 252 is powered by a pump 262 that circulates coolant through conduit and the components of the system. In the illustrated embodiment, coolant flows from the pump 262 to the power electronics 116 via conduit 274. The coolant absorbs heat from the power electronics 116 as it circulates therethrough. The power electronics 116 are connected by a conduit 276 to an auxiliary heater 220, such as a positive temperature coefficient (PTC) heater, battery 114, and heat exchanger 264. The heat exchanger 264 is connected to an inlet 290 of valve 266 by conduit 278, and an outlet 292 of valve 266 is connected to the heater core 268 by conduit 280. The heater core 268 is connected back to the pump 262 by conduit 282. The radiator loop 260 circulates coolant from a second outlet 294 of the valve to a radiator 270 via conduit 284 and bypasses the HVAC unit 272. The radiator 270 is connected to conduit 282 by conduit 286.

The valve 266 is actuatable between a plurality of positions to proportion coolant between the outlet 292 and the outlet 294. The valve 266 includes at least a first position in which 100% of the coolant is circulated to the outlet 292, a second position in which 100% of the coolant circulated to the outlet 294, and one or more intermediate positions in which a proportion of coolant is routed to both outlet 292 and outlet 294. The valve 266 may be an electronically controlled valve that is in electronic communication with a controller 128. The controller 128 may include programming for actuating the valve 266 based on operating conditions of the thermal management system 250.

The controller 128 may be a vehicle-based computing system that includes one or more controllers that communicate via a serial bus (e.g., Controller Area Network (CAN)) or via dedicated electrical conduits. The controller generally includes any number of microprocessors, ASICS, ICs, memory (e.g., FLASH, ROM, RAM, EPROM and/or EEPROM) and software code to cooperate with one another to perform a series of operations. The controller may retrieve or access data stored in memory as a single or multi-dimensional array or lookup table to control the WRSM(s) 104 and cooling system 250. The data may be generated empirically and/or using equations or calibration tools from a test vehicle, simulation, dynamometer, etc. The controller may communicate with other vehicle systems and controllers over one or more wired or wireless vehicle connections using common bus protocols (e.g., CAN and LIN). As used herein, a reference to "a controller" refers to one or more controllers.

The second cooling loop 254 is configured to thermally manage the WRSM(s) 104 and transfer heat to one or more other system components either directly via the second cooling fluid, or indirectly via one or more heat exchangers, such as heat exchanger 264. In the example system illustrated, second cooling loop 254 also includes the transmission 106 and circulates waste heat to the first cooling loop 252 so that the passenger cabin can be heated with heat generated by the transmission 106 in addition to the heat generated by WRSM(s) 104. The transmission 106 includes conduit and/or passageways 200 configured to circulate the second cooling fluid through the electric machine(s) 104, as well as the gearbox and/or the differential. The conduit and/or passageways 200 are also configured to circulate the second cooling fluid through the heat exchanger 264. The heat exchanger 264 is designed to transfer heat between the first and second coolant loops without mixing the associated first and second cooling fluids. The second cooling fluid is circulated by a pump 296 located within the transmission and arranged to draw oil from a transmission sump. The second cooling loop 254 may include a valve 202 upstream of the heat exchanger 264 and a bypass loop 203. The valve 202 may be electronically controlled by the controller 128. The valve 202 may be actuated to circulate the second cooling fluid to the bypass loop 203 at least when the second cooling fluid is cooler than the first cooling fluid so that the second cooling loop 254 does not absorb heat from the first cooling loop 254 when cabin heating is being requested, for example.

The climate control system 256 is responsible for heating and/or cooling the passenger cabin of the vehicle. The HVAC unit 272 includes a housing 204 defining an interior 206. The heater core 268 is disposed within the interior 206 and is configured to receive a fresh airstream from a fresh air inlet 210. A blower 208 is disposed upstream of the heater core 268 and circulates air through the HVAC unit 272. The HVAC unit 272 includes at least one cabin vent 212 that provides air into the passenger cabin. The HVAC unit 272 may also include air-conditioning components. The HVAC unit 272 may include a temperature sensor 214 located within the interior 206 for sensing temperature of the airstream exiting the heater core 268. The sensor 214 may be in electronic communication with the controller 128 and configured to output a signal to the controller 128 indicative of the airstream temperature.

In some embodiments, the heat generated by the power electronics 116, the transmission 106, and the WRSM(s) 104 may be insufficient to heat one or more components to a desired temperature. System 250 may include an optional heater 220 for boosting a temperature of the associated cooling fluid. The heater 220 may be disposed upstream of the heat exchanger 264 or may be located between the heater core 268 and the heat exchanger 264, for example. If the heater 220 is located upstream of the heat exchanger 264, then the heater 220 can be used to heat the second cooling fluid to reduce friction losses in the transmission 106, for example.

The heater 220 may be an electric-resistance heater such as a positive temperature coefficient (PTC) heater. The heater 220 may be powered by the traction battery 114 or by a low-voltage auxiliary battery 120. Many electric vehicles utilize one or more PTC heaters as the sole heat source for the passenger cabin, battery, etc. These PTC heaters typically require high voltages and are powered by the high-voltage bus as opposed to a low-voltage source, e.g., the 12 V auxiliary battery. The high voltage PTC heaters typically require a large amount of electrical power, which reduces vehicle range. In this disclosure, however, the WRSM(s) are controlled to operate in a lossy or inefficient mode to generate significant heat that may be sufficient to eliminate one or more auxiliary heaters.

The first cooling loop 252 may include temperature sensors 222, 224 configured to sense a temperature of the first cooling fluid circulating therethrough, and output signals indicative of the temperatures to the controller 128. Similarly, battery 114 and power electronics 116 may include associated temperature sensors (not shown). Likewise, second cooling loop 254 and/or associated components such as WRSM(s) 104, transmission 106, etc. may include associated temperature sensors that provide temperature signals to the controller 128. The controller 128 may control the WRSM(s) based on one or more of the temperature signals and/or a difference between a temperature signal and a desired temperature for that particular component or cooling loop. Alternatively, temperature of one or more components or cooling fluids may be inferred, estimated, or otherwise determined as generally understood by those of ordinary skill in the art.

The system 250 may be operated in various modes by controlling the illustrated valves to transfer heat from WRSM(s) to battery 114, transmission 106, and/or to the heater core 268 to heat the passenger cabin, for example. While a representative cooling system 250 has been illustrated, those of ordinary skill in the art will recognize various alternative arrangements having a single cooling loop or multiple cooling loops, as well as alternative arrangements of components including heat exchangers, pumps, radiators, bypass valves, etc. that may be used to transfer heat generated by WRSM(s) 104 directly or indirectly to one or more other system components.

Figure 3:
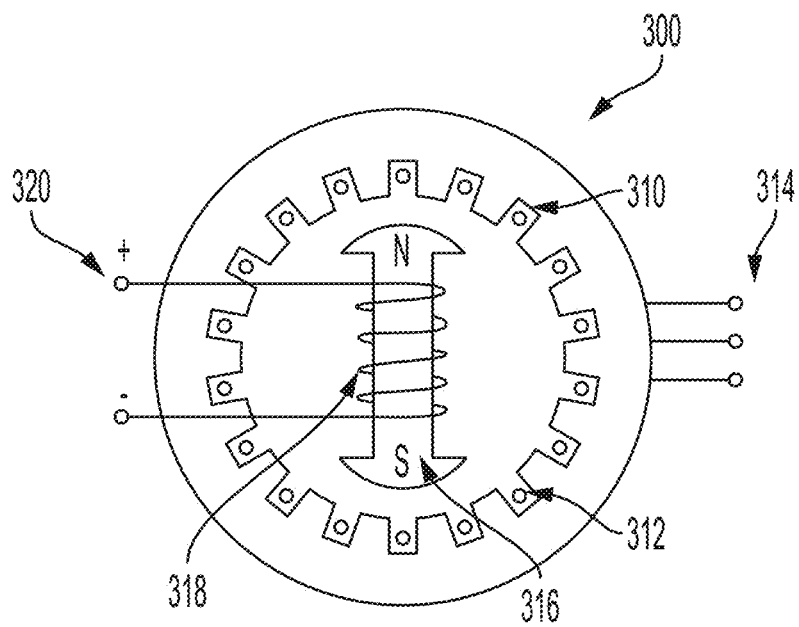
FIG. 3 is a simplified diagram illustrating a three-phase WRSM.

FIG. 3 is a simplified diagram illustrating a three-phase WRSM 300 that includes a stator 310 that includes stator windings 312 disposed within slots of the stator core. The stator windings 312 associated with each phase are arranged symmetrically around the stator core and connected to an alternating current (AC) three-phase supply 314. A salient pole rotor 316 includes a field or rotor winding 318 connected to a direct current (DC) supply 320. While a three-phase machine having a salient pole rotor is illustrated, those of ordinary skill in the art will appreciate that the teachings according to the disclosure may be applied to various other types of WRSM, such as a single phase machine, or machine having a non-salient type rotor, such as a cylindrical rotor, for example, depending on the particular application and implementation. Unlike a permanent magnet synchronous machine, the rotor flux of WRSM 300 can be directly controlled by controlling the DC current supplied to the rotor winding 318. As described in greater detail herein, if supplemental heating is desired to heat the battery or passenger cabin, the controller may reduce the DC rotor excitation current supplied to rotor winding 318 and increase the AC stator current supplied to stator windings 312 to produce more stator power losses while provided the specified or requested motor output torque.

The WRSM torque may be represented by:

$$\text{Torque} = \frac{3}{2} p * I_q^s [M_e I_e + (L_d - L_q) * I_d^s]$$

where $I_q$ and $I_d$ represent the quadrature axis and direct axis stator currents, Ie represents the rotor excitation current, Me represents the mutual inductance, $L_d$ and $L_q$ represent the direct axis and quadrature axis inductance, and p represents the number of poles. For given a given torque, power loss, and normalized speed, the reference direct (d) and quadrature (q) axis stator current and the rotor excitation current may be calibrated in the form of a lookup table or polynomial equation. The variables for inductance are dependent on the values of currents, resulting in a non-convex optimization. The correct current values for given inputs can be found using non-linear optimization solvers, such as Quasi-Newton, Particle Swarm Optimization, etc. The motor torque and the stator losses may be represented by:

$$\text{Torque} = \frac{3}{2} p * I_q^s [M_e(I_d, I_q, I_e) I_e + [L_d(I_d, I_q) - L_q(I_d, I_q)] * I_d^s]$$

$$\text{with Stator Losses} \cong R_s * \sqrt{I_d^2 + I_q^2}$$

Figure 4:
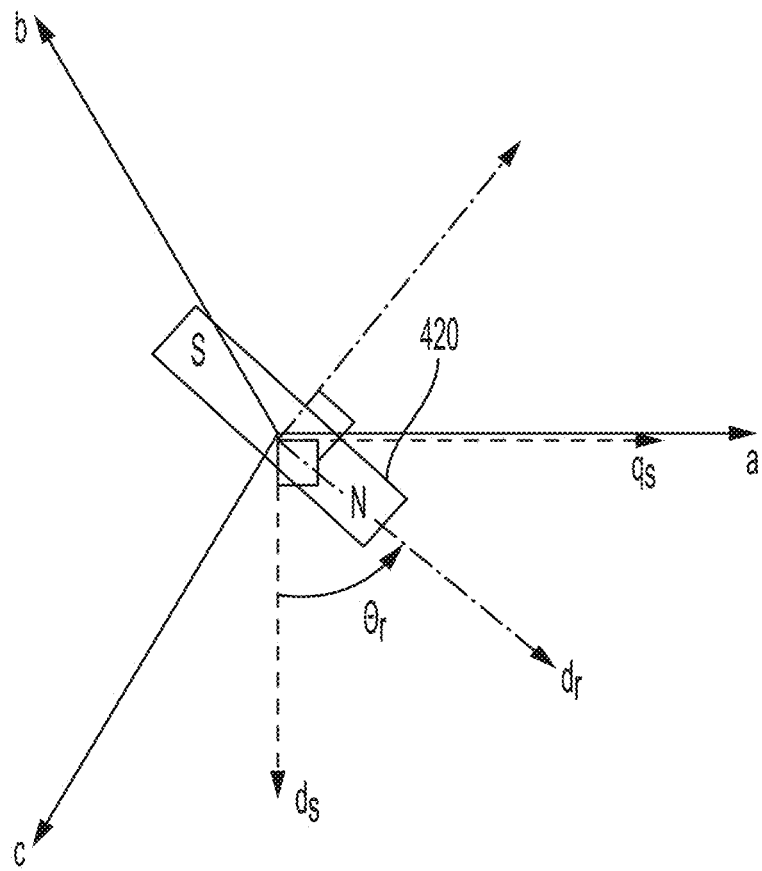
FIG. 4 illustrates the relationship between a three-phase complex coordinate system and associated two-phase representations with direct and quadrature axes for WRSM control.

FIG. 4 illustrates the relationship between a three-phase complex coordinate system and associated two-phase representations with direct and quadrature axis components of the voltage/current for WRSM control. Electric machines such as the WRSM 104 include a wound rotor 420 that rotates within the magnetic field of a stator. The rotor can be mathematically represented relative to a three-phase stationary frame a, b, and c, or alternatively in two dimensions via a stationary direct (d), quadrature (q) frame and a rotating d, q frame. For example, the stationary d, q frame includes a direct axis ds and a quadrature axis $q_s$, and the rotating d, q frame includes a direct axis dr and a quadrature axis qr. The rotating d, q frame is aligned with movement of the rotor 420. Therefore, Or represents an angular position of the rotor 420. The angular position Or of the rotor 420 may be used to calculate the instantaneous current commands $i_a$, $i_b$, and $i_c$ for each of the three-phases (a, b, c) to control the torque and the power losses of the WRSM 104. A signal representing the angular position of the rotor may be provided to the controller by an associated sensor (not shown).

Figure 5:
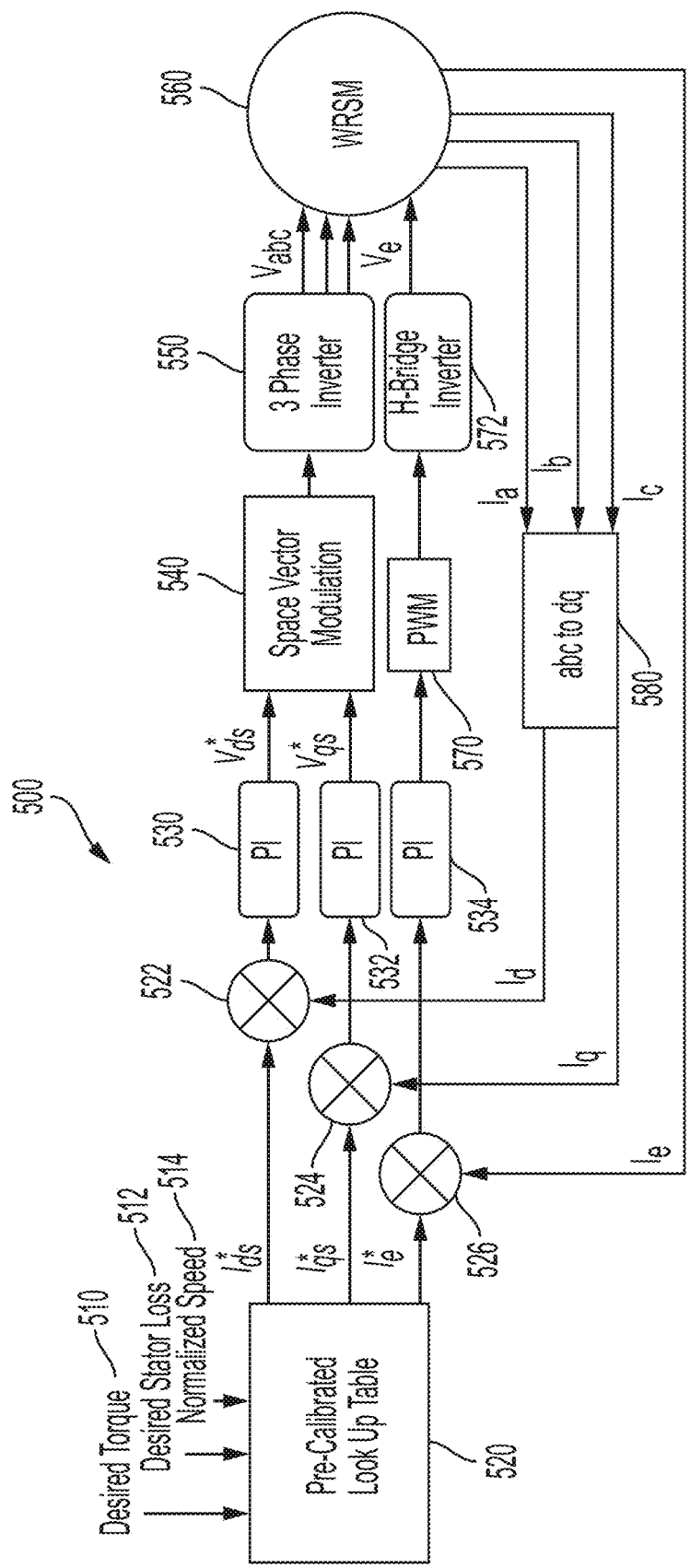
FIG. 5 is a control system block diagram illustrating closed loop control of a WRSM based on a desired output torque and power loss for supplemental heat generation.

FIG. 5 is a control system block diagram illustrating closed loop control of a WRSM based on a desired output torque and desired power loss for supplemental heat generation. Control system 500 is implemented by software and hardware associated with one or more controllers. A specified or desired torque 510, desired stator power loss 512, and normalized speed 514 are used to access or index a pre-calibrated lookup table 520 and retrieve corresponding target values for the stator direct axis current ($I^*_{ds}$) and quadrature axis current ($I^*_{qs}$) and the rotor excitation current ($I^*_e$). The lookup table 520 may be populated using data from CAE and dyno calibration, for example. The target values retrieved from lookup table 520 are compared to respective feedback values at blocks 522, 524, 526 with the difference result provided to respective proportional-integral (PI) controllers 530, 532, 534. The resulting command voltages for the stator direct axis component ($V^*_{ds}$) and quadrature axis component ($V^*_{qs}$) from blocks 530, 532 are provided to space vector modulation block 540 with the output vectors used to control the three-phase inverter 550, which supplies the AC phase voltages ($V_a$, $V_b$, $V_c$) to the respective stator phase windings of WRSM 560. The output of PI controller 534 is converter to a pulse width modulated (PWM) signal at 570 that is rectified by H-bridge inverter 572 to provide a DC voltage ($V_e$) to the rotor windings of WRSM 560. The measured phase currents $I_a$, $I_b$, and $I_c$ are converted to corresponding direct axis current (Id) and quadrature axis current (Iq) at 580 and provided as feedback to blocks 522, 524, respectively. The measured rotor winding current (Ie) is provided as feedback to block 526.

Figure 6A:
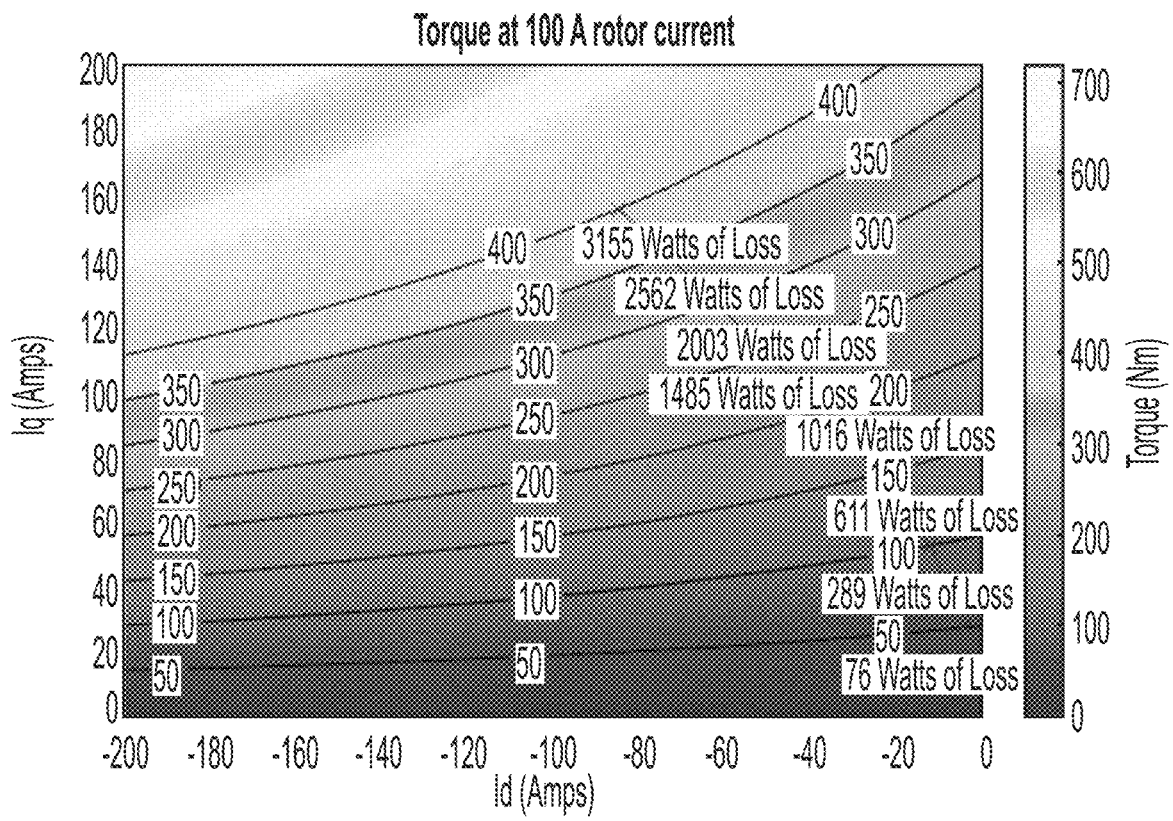
FIG. 6A is a graph illustrating WRSM output torque and power loss relative to stator currents for a 100 A rotor current.
Figure 6B:
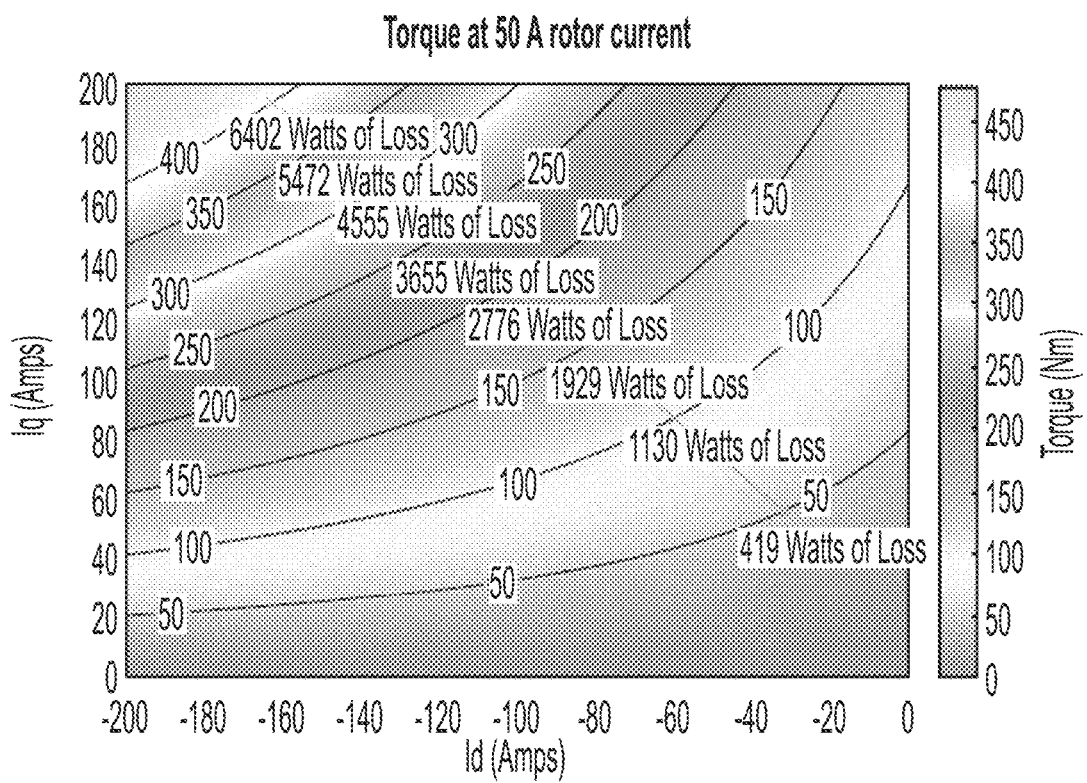
FIG. 6B is a graph illustrating WRSM output torque and power loss relative to stator currents for a 50 A rotor current.
Figure 6C:
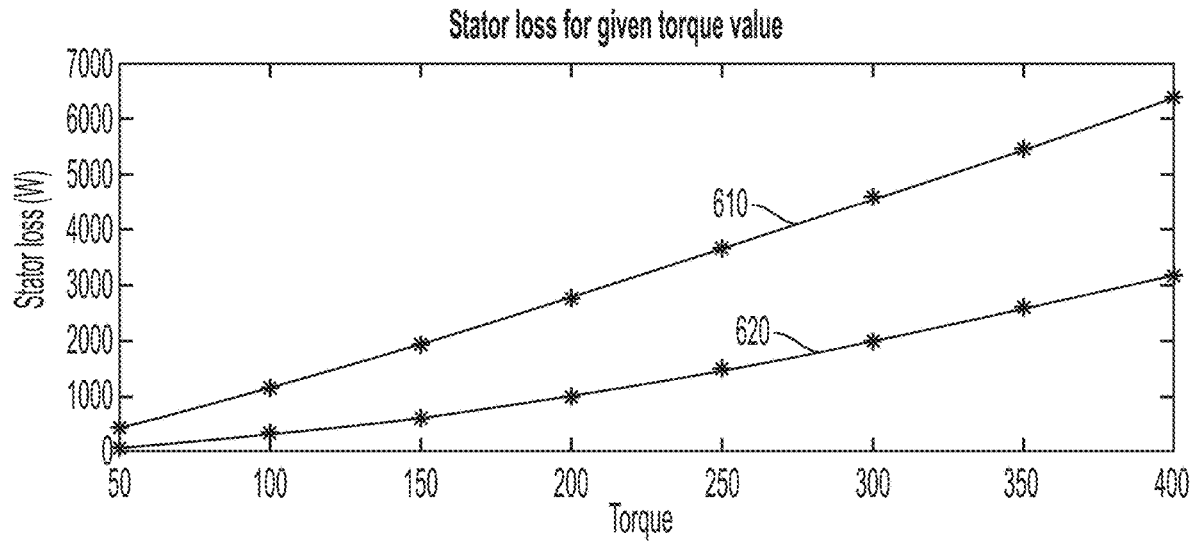
FIG. 6C is a graph illustrating WRSM stator power loss as a function of output torque for 50 A and 100 A rotor currents.

FIGS. 6A-6C illustrate a first calibration strategy with the maximum torque per amp curve calibrated for different values of rotor winding current. FIG. 6A is a graph illustrating WRSM output torque and power loss relative to stator currents ($I_q$, $I_d$) for a 100 A rotor winding current ($I_e$) and FIG. 6B is a graph illustrating WRSM output torque and power loss relative to stator currents ($I_q$, $I_d$) for a 50 A rotor winding current. FIG. 6C is a graph illustrating WRSM stator power loss as a function of output torque for a 50 A rotor winding current represented by data 610, and a 100 A rotor winding current represented by data 620. As illustrated in FIGS. 6A-6C, additional stator power losses and associated heat may be generated by lowering the rotor winding current, which results in higher stator winding currents for a give torque value. Reducing the rotor current by one-half provides approximately doubles the stator power loss.

Figure 7:
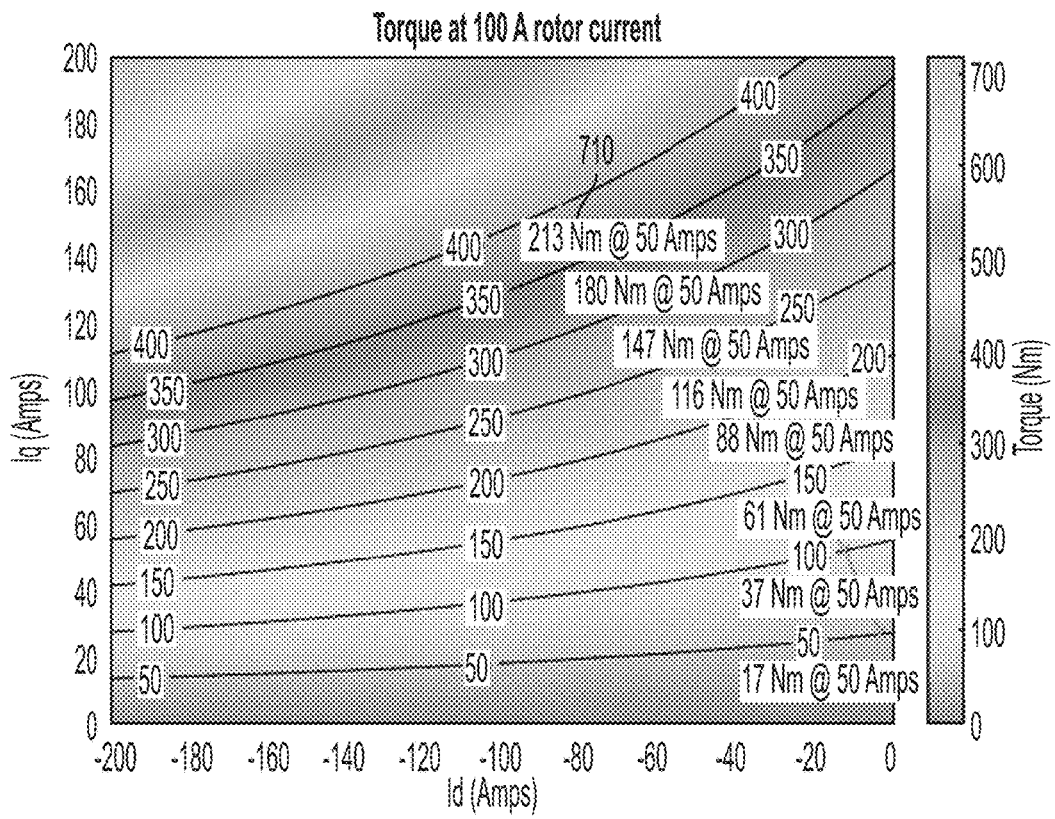
FIG. 7 is a graph illustrating an alternative calibration strategy using WRSM output torque relative to stator currents for 50 A and 100 A rotor currents.

FIG. 7 is a graph illustrating an alternative calibration strategy using WRSM output torque relative to stator currents for 50 A and 100 A rotor winding currents. In this calibration strategy, the maximum torque per amp curve is derived for one rotor winding current value (100 A). When the rotor current is reduced to a predetermined value (50 A in this example), the derived curve 710 is used to determine the stator currents to produce the desired torque. This increases the stator currents ($I_q$, $I_d$) and increases stator losses for a given torque.

Figure 8:
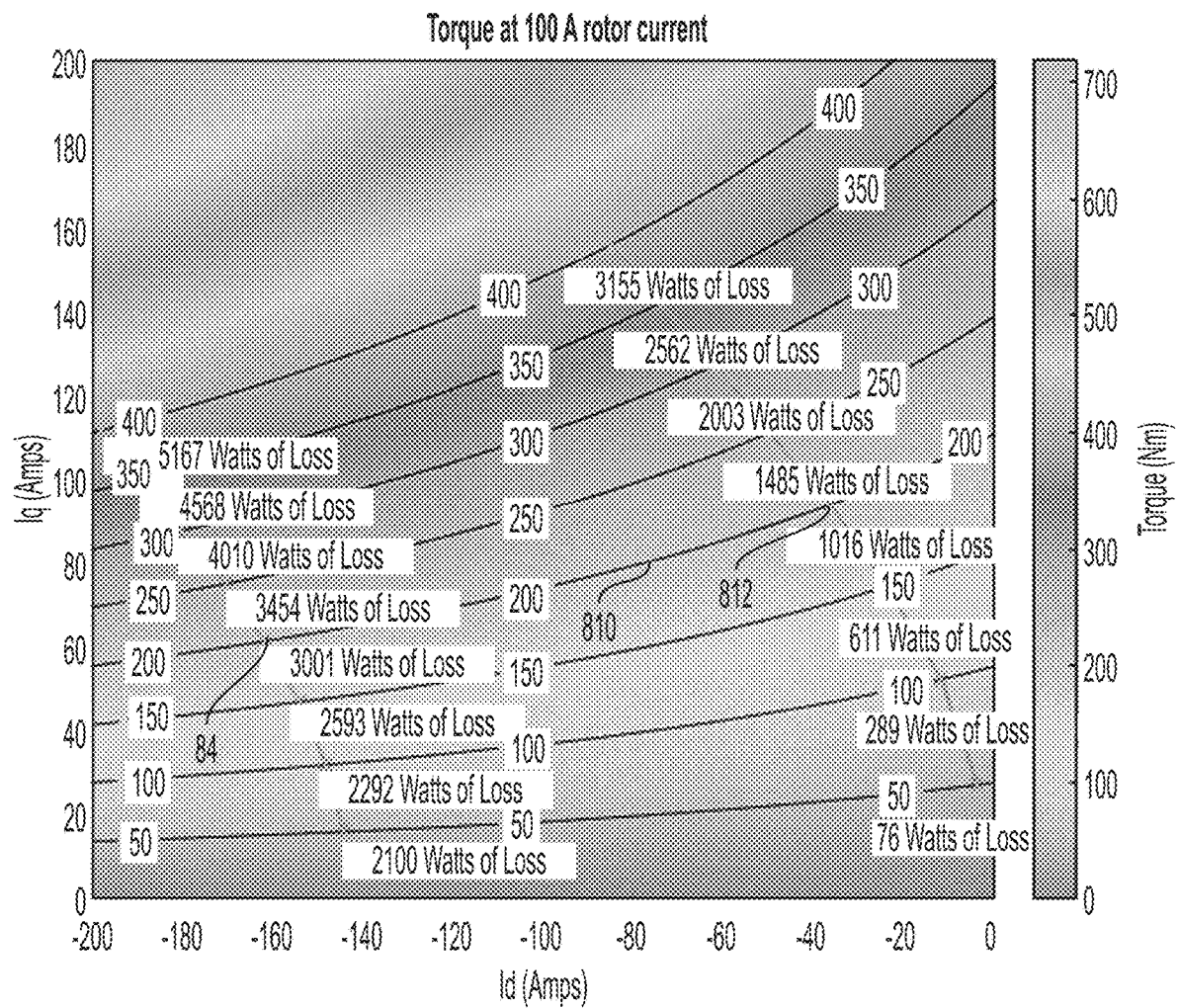
FIG. 8 is a graph illustrating another calibration strategy to determine WRSM stator currents for a desired WRSM output torque and power loss with a specified rotor current.

FIG. 8 is a graph illustrating another calibration strategy to determine WRSM stator currents for a desired WRSM output torque and power loss with a specified rotor winding current (100 A in this example). For a specified WRSM torque and rotor winding current, the system can increase stator losses and associated heat generation by moving along the corresponding torque curve to provide the specified torque with a higher stator power loss. For example, for a specified torque of 200 Nm and rotor winding current of 100 A represented by torque line 810, stator power losses may be increased from 1016 W at point 812 to 3001 W at point 814 by appropriate control of the stator currents ($I_q$, $I_d$).

Figure 9:
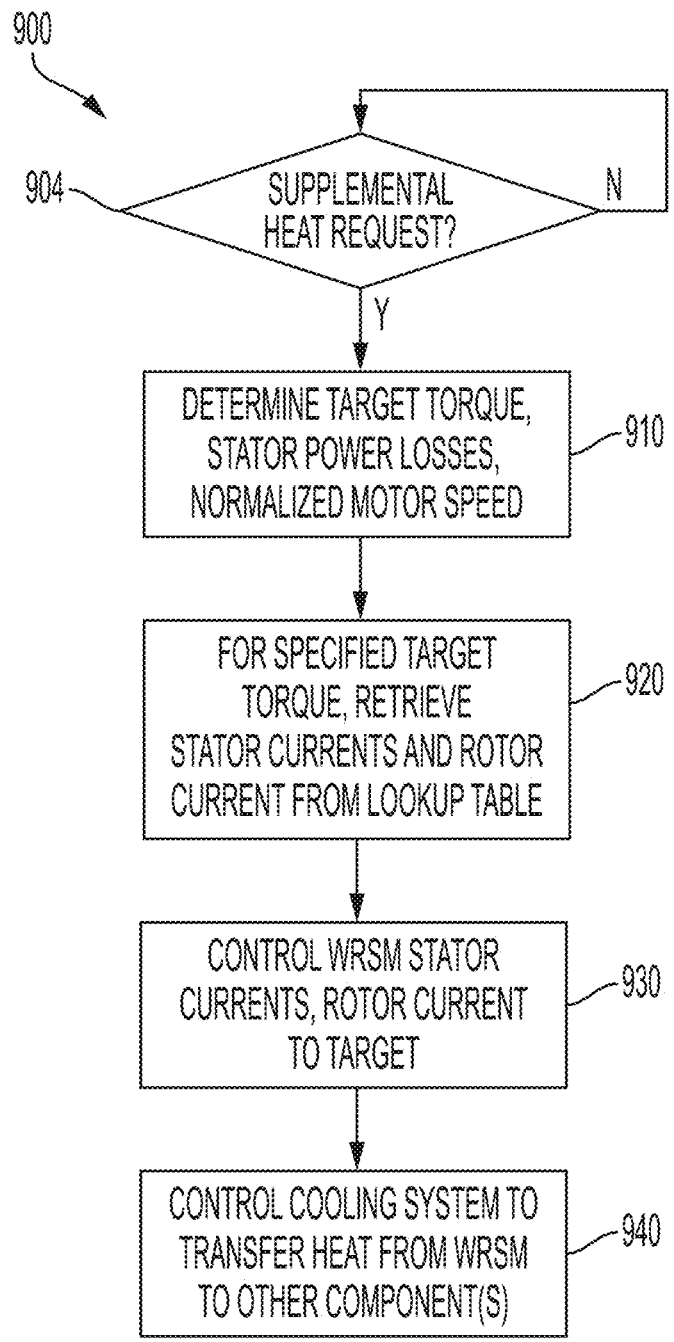
FIG. 9 is a flowchart illustrating operation of a system or method for controlling a WRSM to heat one or more system components.

FIG. 9 is a flowchart illustrating operation of a system or method for controlling a WRSM to heat one or more system components. The controller 128 (FIGS. 1-2) may cooperate with one or more other controllers to perform one or more control functions described herein. Control logic, functions, code, software, strategy etc. performed by one or more processors or controllers such as controller 128 may be represented by the block diagrams or flow charts shown in the various figures. The flow chart or block diagram 900 of FIG. 9 illustrates a representative control strategy, algorithm, and/or logic for operation of a system or method including a WRSM controlled to operate in a lossy or inefficient mode to generate heat for transfer to one or more other components, and may be implemented using one or more processing strategies such as event-driven, interrupt-driven, multi-tasking, multi-threading, and the like. As such, various steps or functions illustrated or described may be performed in the sequence as illustrated or described, in parallel, or in some cases omitted. Although not always explicitly illustrated or described, one of ordinary skill in the art will recognize that one or more of the steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, powertrain, or other controller or control module. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer or controller to control a WRSM, cooling system, vehicle, etc.

Block 904 represents receiving a supplemental heat request to operate the WRSM at an inefficient operating point to generate supplemental heat for transfer to another component, such as a battery, for example. The supplemental heat request may be triggered by an associated condition or flag based on one or more component temperatures or cooling system temperatures as previously described. For example, a supplemental heat request may be triggered by battery temperature or ambient temperature being below an associated temperature threshold, or a temperature difference between a target temperature and a measured or estimated temperature exceeding an associated threshold, or a cooling fluid of an associated cooling system being below an associated threshold or target temperature, etc. If a supplemental heat request is indicated at 904, then a corresponding target stator power loss for the current requested/target WRSM torque and normalized rotational speed (RPM) is determined as represented at 910. The target stator power loss may vary depending on the heating rate desired for heating a particular component, which may in turn be based on a selected or determined operating mode (such as efficiency or power mode), battery state of charge, magnitude of temperature differential between a target and desired temperature, etc. Block 920 then retrieves the stator currents and rotor current from a corresponding lookup table for the specified target torque. The controller then performs closed loop feedback control of the stator currents and rotor current to achieve the target values to generate the stator power losses and associated supplemental heat as represented at 930. An associated cooling system may be controlled as indicated at 940 to transfer the supplemental heat from the WRSM to one or more other components as previously described.

While representative examples are described above, it is not intended that these examples describe all possible forms or implementations of the claimed subject matter. The words used in the specification are words of description rather than limitation, and it is understood that various changes may be made without departing from scope of the claims. Additionally, the features of various implementing examples may be combined with one or more features from other examples to form further examples or embodiments of the claimed subject matter whether or not the particular combination of features is explicitly illustrated or described in detail. Although one or more examples or features may have been described as providing advantages over other examples or prior art implementations with respect to one or more desired characteristics, those of ordinary skill in the art recognize that one or more features or characteristics can be compromised to achieve desired overall system attributes, which depend on the specific application and implementation. As such, examples described as less desirable than others or prior art implementations with respect to one or more characteristics are not outside the scope of the disclosure and may be desirable for particular applications.

What is claimed is:

1. An electrified vehicle comprising:
    a wound rotor synchronous electric machine configured to provide propulsive torque to wheels of the electrified vehicle, the electric machine having a rotor with rotor windings and a stator with stator windings;
    a battery electrically coupled to the electric machine;
    a cooling system arranged to circulate a cooling fluid that transfers heat from the electric machine to the battery; and
    a controller programmed to, for a specified electric machine torque, control rotor current to the rotor windings and control stator current to the stator windings in response to temperature of the cooling fluid, wherein the controller is further programmed to control the rotor current and the stator current responsive to a target power loss for the stator windings.

2. The electrified vehicle of claim 1 wherein the controller is further programmed to, for the specified electric machine torque, reduce the rotor current and increase the stator current when the temperature of the cooling fluid is below an associated threshold relative to the rotor current and stator current when the temperature of the cooling fluid is not below the associated threshold.

3. The electrified vehicle of claim 1 wherein the controller is further programmed to control the rotor current and the stator current in response to magnitude of a difference between the temperature of the cooling fluid and a desired temperature of the cooling fluid.

4. The electrified vehicle of claim 2 wherein the controller is further programmed to reduce the rotor current to a predetermined rotor current that is independent of the specified electric machine torque, and to increase the stator current to deliver the specified electric machine torque.

5. The electrified vehicle of claim 1 wherein the rotor current is a direct current (DC) and the stator current is an alternating current (AC).

6. The electrified vehicle of claim 1 wherein the electric machine comprises a three-phase electric machine, the electrified vehicle further comprising:
    an inverter in communication with the controller and configured to convert DC power from the battery to AC power supplied to the stator windings, wherein the cooling system is further arranged to transfer heat from the inverter to the battery.

7. The electrified vehicle of claim 6 further comprising a transmission configured to transmit torque from the electric machine to the wheels, wherein the cooling system comprises:
    an oil cooling loop including an oil-to-coolant heat exchanger and arranged to circulate the cooling fluid through the electric machine, the transmission, and the oil-to-coolant heat exchanger; and
    a coolant loop including a radiator, and a heater core configured to heat a passenger cabin, the coolant loop arranged to selectively circulate coolant through the heater core, and to circulate coolant through the radiator, the inverter, and the heat exchanger.

8. The electrified vehicle of claim 1 further comprising an internal combustion engine.

9. A method for controlling an electrified vehicle having a battery powering a wound rotor synchronous machine (WRSM) configured to provide propulsive torque to vehicle wheels, the method comprising, by a controller:
    for a specified output torque of the WRSM:
        controlling DC current of rotor windings to a first rotor current value and AC current of stator windings to a first stator current value to generate the specified output torque when temperature of the battery is above an associated threshold; and
        controlling the DC current of the rotor windings to a second rotor current value less than the first rotor current value and the AC current of the stator windings to a second stator current value greater than the first stator current value to generate the specified output torque otherwise,
    wherein the second rotor current value and the second stator current value are based on a target power loss of the stator windings.

10. The method of claim 9 further comprising controlling a cooling system of the electrified vehicle to transfer heat from the WRSM to the battery when the temperature of the battery is below the associated threshold.

11. The method of claim 9 further comprising retrieving the second rotor current value and the second stator current value from a lookup table stored in a non-transitory computer readable storage medium.

12. The method of claim 9 wherein the second rotor current value is a predetermined constant value that is independent of the specified output torque of the WRSM.

13. The method of claim 9 further comprising controlling a cooling system of the electrified vehicle to transfer heat from the WRSM to a passenger cabin of the electrified vehicle.

14. A system comprising:
    a wound rotor synchronous machine (WRSM) having a rotor winding and a stator winding;
    a cooling system configured to circulate a fluid that transfers heat from the WRSM to at least one other component of the system; and
    a controller programmed to perform closed-loop control of DC current to the rotor winding and AC current to the stator winding responsive to a target output torque and target stator power loss of the WRSM,
    wherein the target stator power loss is based on temperature of the at least one other component being below a corresponding temperature threshold and magnitude of a difference between the temperature of the at least one other component and the corresponding temperature threshold.

15. The system of claim 14 wherein the controller retrieves a target DC current and a target AC current from a lookup table indexed by the target torque and stator power loss.

16. The system of claim 14 wherein the WRSM comprisecomprises a three-phase electric machine.

17. The system of claim 14 wherein the at least one other component comprises a battery electrically connected to the WRSM.

\* \* \* \* \*